United States Patent
Dumalski et al.

(10) Patent No.: US 10,351,172 B2
(45) Date of Patent: Jul. 16, 2019

(54) TANDEM STEERING FOR A GRAIN CART

(71) Applicant: Brandt Agricultural Products Ltd., Regina (CA)

(72) Inventors: Josh Dumalski, Regina (CA); Dallas Herbel, Regina (CA); Mitch Stilborn, Regina (CA)

(73) Assignee: Brandt Agricultural Products Ltd., Regina (CA)

( * ) Notice: Subject to any disclaimer, the term of this patent is extended or adjusted under 35 U.S.C. 154(b) by 191 days.

(21) Appl. No.: 15/445,083

(22) Filed: Feb. 28, 2017

(65) Prior Publication Data
US 2018/0244311 A1    Aug. 30, 2018

(51) Int. Cl.
| B62D 13/00 | (2006.01) |
| B62D 13/04 | (2006.01) |
| B60G 7/00 | (2006.01) |
| B60G 5/02 | (2006.01) |
| A01B 69/00 | (2006.01) |
| B62D 63/08 | (2006.01) |
| A01D 90/10 | (2006.01) |
| B60P 1/40 | (2006.01) |

(52) U.S. Cl.
CPC ............ B62D 13/00 (2013.01); A01B 69/003 (2013.01); B60G 5/02 (2013.01); B60G 7/003 (2013.01); B62D 13/04 (2013.01); A01D 90/10 (2013.01); *B60G 2200/44* (2013.01); *B60G 2300/04* (2013.01); *B60G 2300/07* (2013.01); *B60G 2300/08* (2013.01); *B60P 1/40* (2013.01); *B62D 63/08* (2013.01)

(58) Field of Classification Search
CPC ........ A01B 69/00; A01B 69/003; B62D 5/28; B62D 13/00; B62D 63/08; B62D 13/04; B62D 13/005; B60G 5/02; B60G 5/04; B60G 7/003
See application file for complete search history.

(56) References Cited

U.S. PATENT DOCUMENTS

| 81,217 | A | * | 8/1868 | Sexton | ................... | B62D 13/04 |
| | | | | | | 280/99 |
| 720,713 | A | * | 2/1903 | Lieb | ....................... | B62D 13/04 |
| | | | | | | 180/65.1 |

(Continued)

OTHER PUBLICATIONS

U.S. Appl. No. 15/445,151, filed Feb. 28, 2017.
U.S. Appl. No. 15/445,160, filed Feb. 28, 2017.

*Primary Examiner* — Joseph M Rocca
*Assistant Examiner* — Maurice L Williams
(74) *Attorney, Agent, or Firm* — Frost Brown Todd LLC

(57) ABSTRACT

A grain cart is provide having a wheel assembly with four ground wheels that all pivot in unison. The wheel assembly can include a first side front wheel, a first side rear wheel, a second side front wheel and a second side rear wheel. A first side steering link assembly can be operatively coupled between the first side front wheel and the first side rear wheel to cause the first side front wheel and the second side rear wheel to pivot in opposite directions. A second side steering link can be operatively coupled between the second side front wheel and the second side rear wheel to cause the second side front wheel and the second side rear wheel to pivot in opposite directions. A unison linkage assembly operatively can couple the movement of the first side rear wheel and second side rear wheel.

19 Claims, 10 Drawing Sheets

(56) References Cited

U.S. PATENT DOCUMENTS

| | | | | |
|---|---|---|---|---|
| 728,809 | A * | 5/1903 | Sandstrom | B62D 13/04 280/100 |
| 2,710,198 | A * | 6/1955 | Hall | B62D 13/00 280/419 |
| 3,454,123 | A * | 7/1969 | Lewis | B62D 13/005 180/14.4 |
| 3,994,512 | A | 11/1976 | Parker et al. | |
| 4,494,766 | A * | 1/1985 | McHugh | B60G 17/0523 280/444 |
| 5,013,208 | A | 5/1991 | Grieshop | |
| 5,100,281 | A | 3/1992 | Grieshop | |
| 5,108,249 | A | 4/1992 | Kinzenbaw et al. | |
| 5,139,314 | A | 8/1992 | Deckler | |
| 5,340,265 | A | 8/1994 | Grieshop | |
| 5,407,137 | A | 4/1995 | Linde et al. | |
| 5,409,344 | A | 4/1995 | Tharaldson | |
| 5,477,937 | A | 12/1995 | Chagnon | |
| 5,516,253 | A | 5/1996 | Linscheid et al. | |
| 5,538,388 | A | 7/1996 | Bergkamp et al. | |
| 5,615,990 | A | 4/1997 | Grieshop | |
| 5,655,872 | A | 8/1997 | Plotkin | |
| 5,659,470 | A | 8/1997 | Goska et al. | |
| 5,666,793 | A | 9/1997 | Bottinger | |
| 5,733,094 | A | 3/1998 | Bergkamp et al. | |
| 5,788,055 | A | 8/1998 | Stewart et al. | |
| 5,842,920 | A | 12/1998 | Siepker | |
| 5,876,176 | A | 3/1999 | Smith et al. | |
| 5,888,044 | A | 3/1999 | Baskerville | |
| 5,904,365 | A | 5/1999 | Dillon | |
| 5,980,189 | A | 11/1999 | Rubner | |
| 6,017,182 | A | 1/2000 | Grieshop | |
| 6,042,326 | A | 3/2000 | Thomas et al. | |
| 6,095,616 | A | 8/2000 | Grieshop | |
| 6,131,691 | A | 10/2000 | Morch | |
| 6,135,484 | A | 10/2000 | Lauronen et al. | |
| 6,216,071 | B1 | 4/2001 | Motz | |
| 6,261,050 | B1 | 7/2001 | Kuhns | |
| 6,296,435 | B1 | 10/2001 | Wood et al. | |
| 6,308,976 | B1 | 10/2001 | Mitchell | |
| 6,434,462 | B1 | 8/2002 | Bevly et al. | |
| 6,488,114 | B1 | 12/2002 | McMahon et al. | |
| 6,497,546 | B2 | 12/2002 | Wood et al. | |
| 6,591,875 | B2 | 7/2003 | Zaun et al. | |
| 6,632,135 | B2 | 10/2003 | Matousek et al. | |
| 6,682,416 | B2 | 1/2004 | Behnke et al. | |
| 6,767,174 | B2 | 7/2004 | Cresswell | |
| 6,776,569 | B1 | 8/2004 | McMahon et al. | |
| 6,893,202 | B2 | 5/2005 | Hunt | |
| 6,943,824 | B2 | 9/2005 | Alexia et al. | |
| 6,968,913 | B1 * | 11/2005 | Priepke | B62D 7/142 180/6.24 |
| 7,010,425 | B2 | 3/2006 | Gray et al. | |
| 7,034,666 | B2 | 4/2006 | Knutson | |
| 7,099,760 | B2 | 8/2006 | Lin et al. | |
| 7,134,830 | B2 | 11/2006 | Wood | |
| 7,191,061 | B2 | 3/2007 | McKay et al. | |
| 7,198,337 | B2 | 4/2007 | Deckler et al. | |
| 7,225,060 | B2 | 5/2007 | O'Connor et al. | |
| 7,287,639 | B2 | 10/2007 | Brandt | |
| 7,381,131 | B1 | 6/2008 | Harpole | |
| 7,494,409 | B2 | 2/2009 | Voss et al. | |
| 7,540,700 | B2 | 6/2009 | Hook | |
| 7,543,365 | B2 | 6/2009 | Van Mill et al. | |
| 7,756,624 | B2 | 7/2010 | Diekhans et al. | |
| 7,810,823 | B2 | 10/2010 | Van Mill et al. | |
| 8,047,757 | B1 | 11/2011 | Wood | |
| 8,167,527 | B2 | 5/2012 | Kinzenbaw | |
| 8,260,499 | B2 | 9/2012 | Boydell | |
| 8,328,497 | B2 | 12/2012 | Wood | |
| 8,544,574 | B2 | 10/2013 | Fegley et al. | |
| 8,565,984 | B2 | 10/2013 | Mayfield et al. | |
| 8,585,343 | B2 | 11/2013 | Wood | |
| 8,684,649 | B2 | 4/2014 | Redekop | |
| 8,702,368 | B2 | 4/2014 | Van Mill et al. | |
| 9,039,340 | B2 | 5/2015 | Van Mill et al. | |
| 9,102,478 | B2 | 8/2015 | Van Mill et al. | |
| 2004/0184905 | A1 | 9/2004 | Kinzenbaw et al. | |
| 2009/0273159 | A1 * | 11/2009 | Sutton | B60G 3/06 280/419 |
| 2010/0209223 | A1 | 8/2010 | Van Mill et al. | |
| 2010/0254792 | A1 | 10/2010 | Kinzenbaw | |
| 2011/0095503 | A1 | 4/2011 | Dodd et al. | |
| 2011/0164952 | A1 | 7/2011 | Hollenberg | |
| 2011/0175322 | A1 | 7/2011 | McMahon et al. | |
| 2017/0203623 | A1 * | 7/2017 | Pettersson | B60G 5/02 |

* cited by examiner

TANDEM STEERING FOR A GRAIN CART

FIELD OF THE INVENTION

The present invention relates to a grain cart and more particularly to a wheel assembly for the grain cart to allow a set of tandem wheels on the grain cart to pivot together in combination.

BACKGROUND

Grain carts are typically used to transfer grain or other crop material from a combine harvester to a grain truck or bin. The grain cart typically comprises a storage hopper for crop material, an auger assembly for emptying crop material from the storage hopper and a set of ground wells so that the grain cart can be towed. While smaller grain carts may have a single pair of wheels, larger grain carts now commonly have a tandem set of wells (two wheels on each side of the grain cart). A tractor is commonly used to tow the grain cart with the auger assembly of the grain cart being driven off of the power take off (PTO) of the tractor (although hydraulics, etc. could also be used to power the auger assembly).

In use, the grain cart is towed by the tractor to a combine harvester where the crop material is unloaded from the combine harvester into the grain cart. With the crop material loaded into the storage hopper of the grain cart, the tractor can tow the grain cart to a truck, trailer, storage bin, etc. and use the auger system to unload the crop material from the grain cart.

Grain carts are getting larger and larger and some are now quite large. The larger grain carts now use tandem wheels on each side of these grain carts so that these larger grain carts are supported by four wheels in total. However, these tandem wheels can make it hard to turn the grain cart if the wheels are fixed in position. Instead, it is desirable to have a wheel assembly that allows the wheels to pivot when the grain cart is turned in order to allow the wheels of the grain cart to follow a curved path while the components used in the wheel assembly are relatively simply and still allow the wheels to be fixed in place to make it easier or even possible to reverse the grain cart.

BRIEF SUMMARY

In a first aspect, a grain cart is providing having a frame, a hitch assembly attached to a front end of the frame, a storage hopper provided on the frame, an auger assembly operatively connected to the storage hopper to discharge particulate material from the storage hopper out of the grain cart and a wheel assembly attached to the frame. The wheel assembly can include a first side suspension member, a second side suspension member, a first side front wheel rotatively and pivotally connected to a front end of the first side suspension member, a first side rear wheel rotatively and pivotally connected to a rear end of the first side suspension member, a second side front wheel rotatively and pivotally connected to a front end of a second side suspension member, a second side rear wheel rotatively and pivotally connected to a rear end of the second side suspension member, a first side steering link assembly operatively coupling the pivoting of the first side front wheel and the first side rear wheel so that the first side front wheel and the second side rear wheel pivot in opposite directions, a second side steering link assembly operatively coupling the pivoting of the second side front wheel and the second side rear wheel so that the second side front wheel and the second side rear wheel pivot in opposite directions and a unison linkage assembly operatively coupling the pivoting of the first side rear wheel and first side front wheel with the pivoting of the second side rear wheel and the second side front wheel.

In a further aspect, a grain cart can be provided wherein the first side steering link assembly includes a first side rear suspension link connected to a first steering arm of the first side rear wheel, a first side bell crank having a first side and a second side, the first side of the first side bell crank connected to the first side rear suspension link and a first side front suspension link connected to a steering arm of the first side front wheel and the second side of the first side bell crank.

In a further aspect, a grain cart can be provided wherein the first side steering link assembly includes a first side rear suspension link connected to a first steering arm of the first side rear wheel, a first side bell crank having a first side and a second side, the first side of the first side bell crank connected to the first side rear suspension link, and a first side front suspension link connected to a steering arm of the first side front wheel and the second side of the first side bell crank.

In a further aspect, a grain cart is provided wherein the unison linkage includes a first side cross linkage connected to a lower steering arm of the first side rear tire, a first cross bell crank having a first side and a second side, the first side connected to the first side cross linkage, a second cross bell crank having a first side and a second side, a second side cross linkage connected to a lower steering arm of the second side rear tire and the first side of the second cross bell crank and a rod member connected between the second side of the first cross bell crank and a second side of the second cross bell crank.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
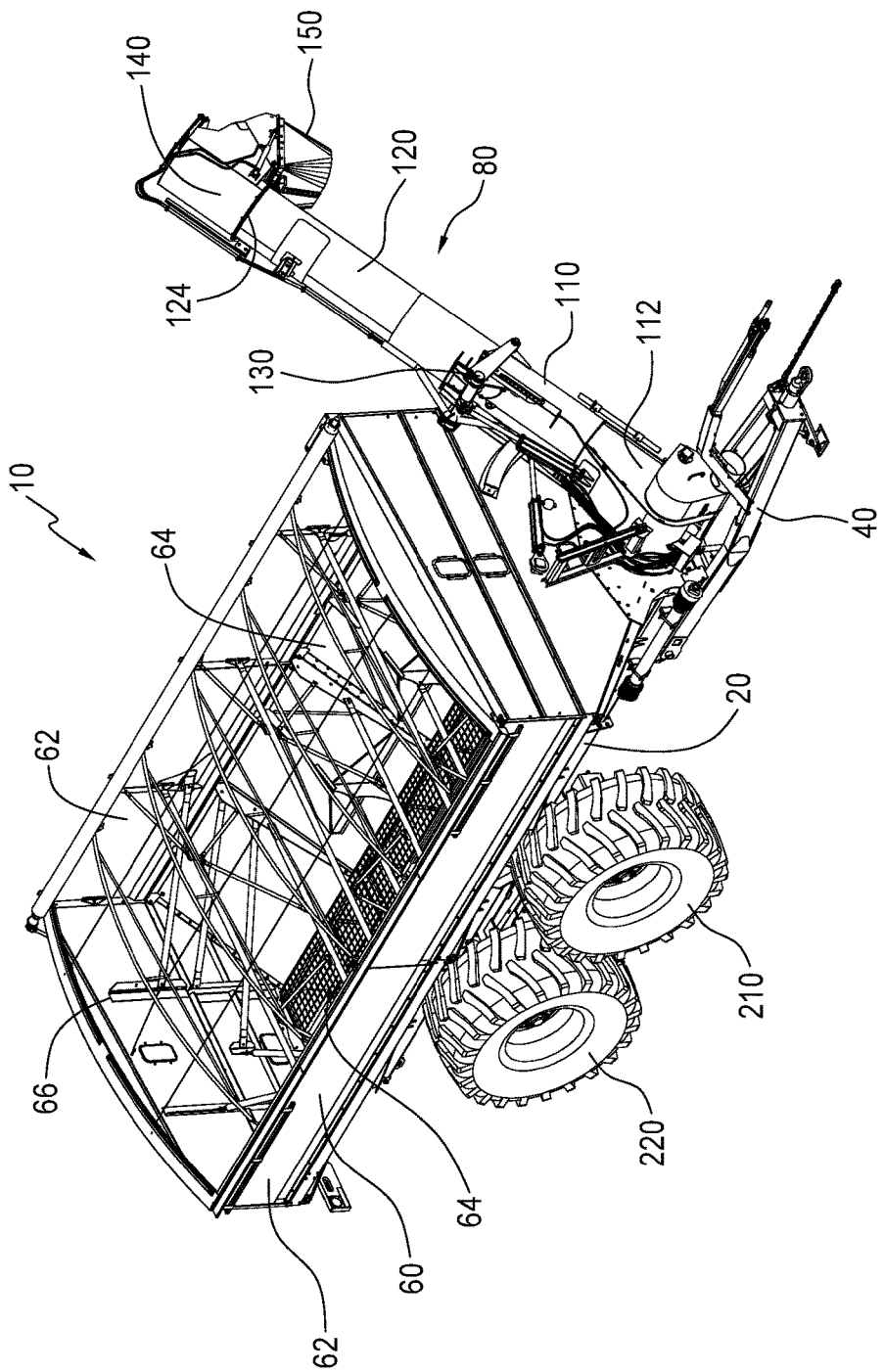
FIG. 1 is a perspective view of a grain cart.
Figure 2:
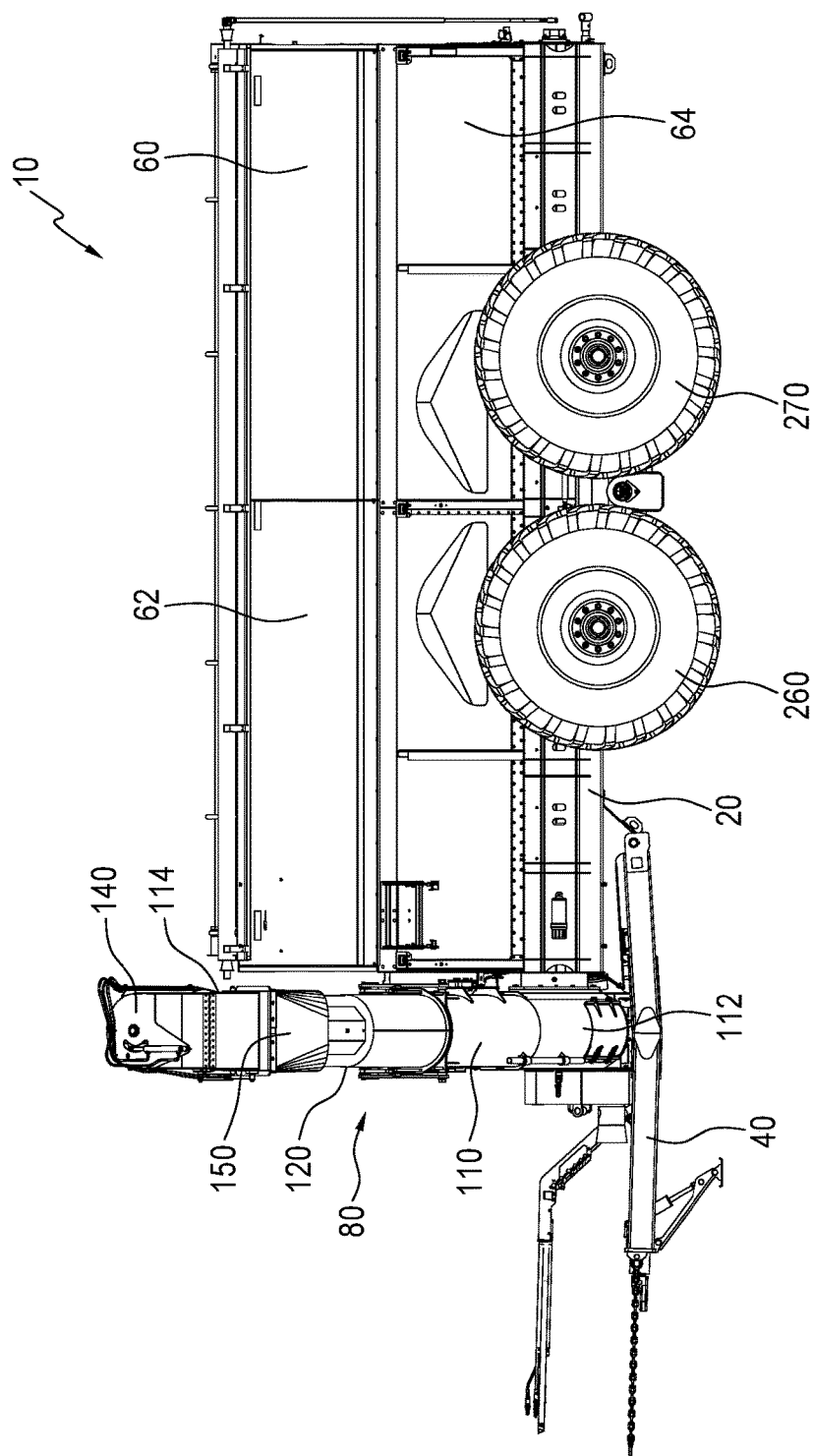
FIG. 2 is a side view of the grain cart of FIG. 1.
Figure 3:
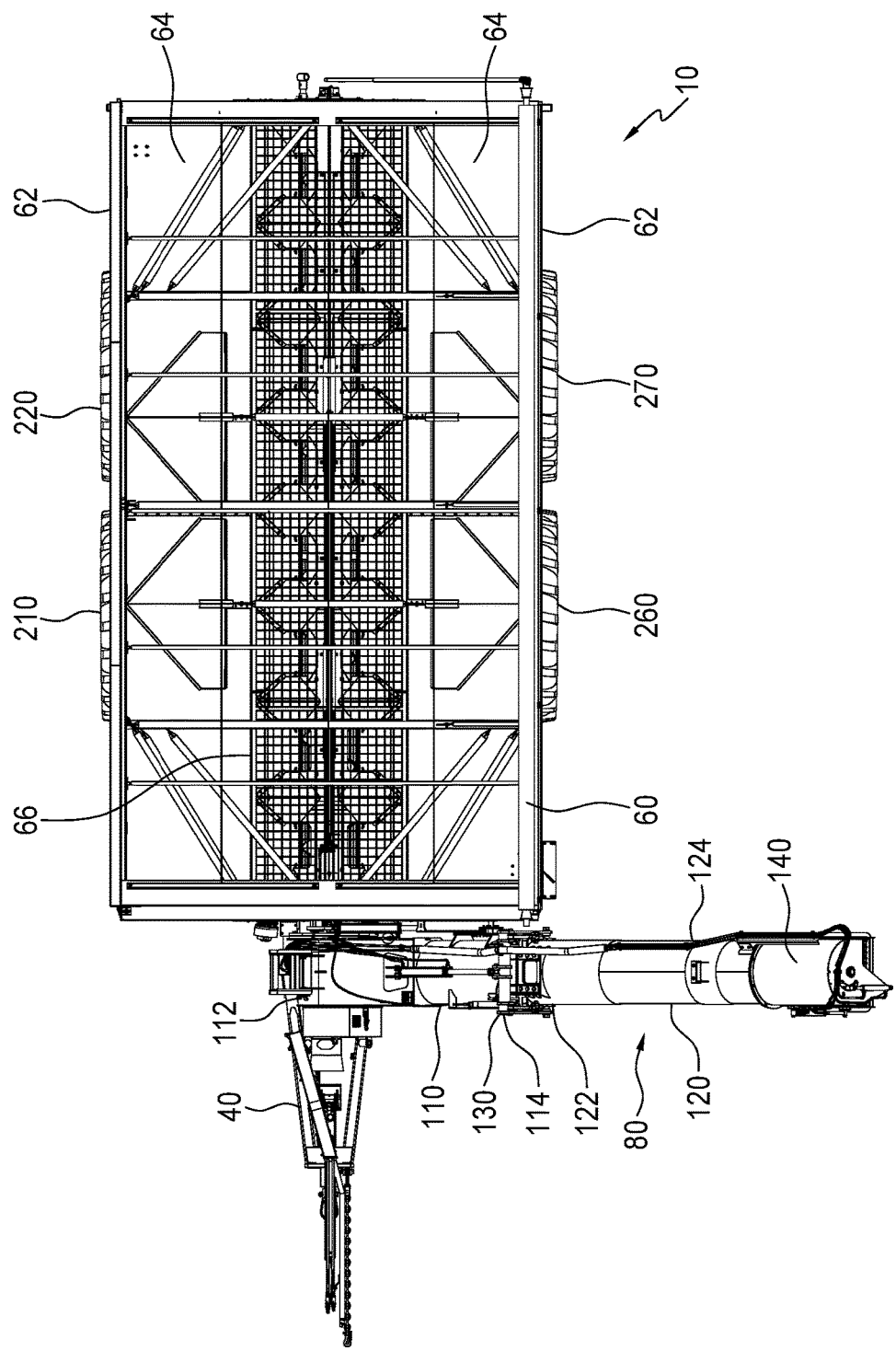
FIG. 3 is a top view of the grain cart of FIG. 1.

FIGS. 1-5 illustrates a grain cart 10. The grain cart 10 can have a frame 20, ground wheels 210, 220, 260 and 270, a hitch assembly 40, a storage hopper 60 for storing crop material and an auger assembly 80. Crop material can be loaded into the storage hopper 60 of the grain cart 10 for transport to another location. When the grain cart 10 has been towed by a tow vehicle to another location, the auger assembly 80 can be used to unload the crop material from the storage hopper 60 out of the grain cart 10.

The frame 20 can support the storage hopper 60 and the wheels 210, 220, 260 and 270 can be operatively attached to the frame 20. The hitch assembly 40 can be connected to the front of the frame 20 and the hitch assembly 40 can then be hitched to a tow vehicle, such as a tractor (not shown), to tow the grain cart 10.

The storage hopper 60 has an interior portion for storing crop material. The upper side walls 62 of the storage hopper 60 can be relatively vertical while the lower walls 64 can be angled inwards to direct crop material into a center portion 66 at the bottom of the hopper 60. Crop material loaded into the storage hopper 60 will be directed by gravity towards the center portion 66 in the bottom of the storage hopper 60.

Figure 6:
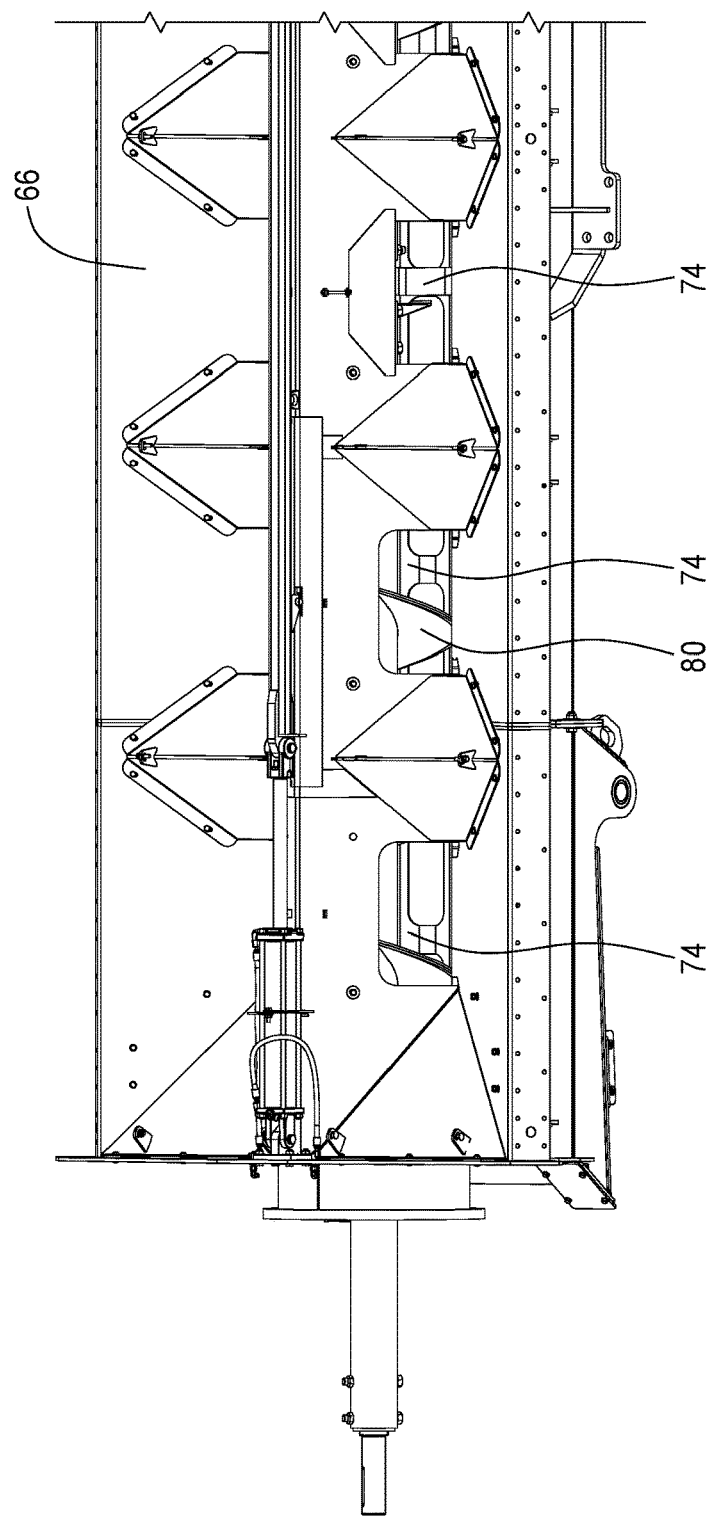
FIG. 6 is a partial view of the bottom of a storage hopper of a grain cart with openings to a transport assembly.
Figure 7:
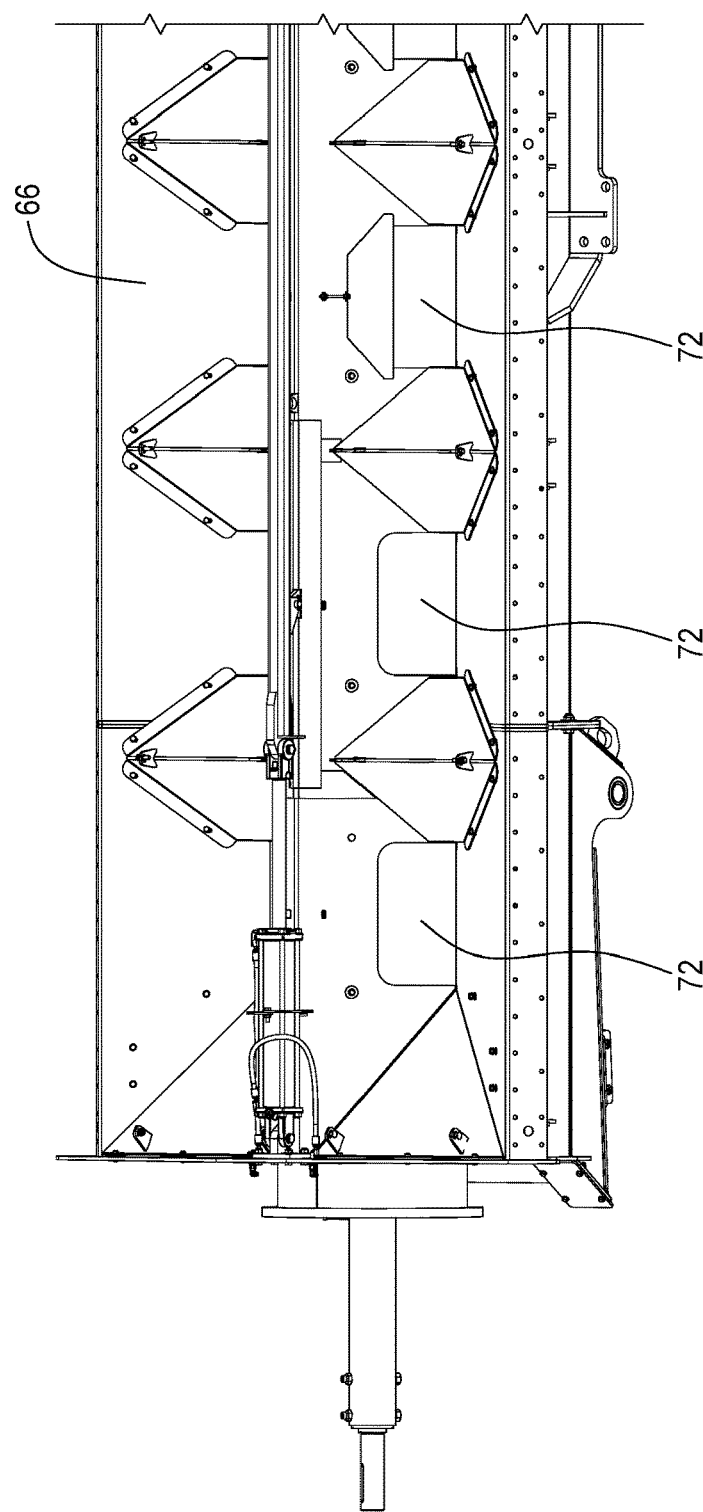
FIG. 7 is a partial view of the bottom of the storage hopper of FIG. 6 with the openings closed by gates.

FIGS. 6 and 7 shows the center portion 66 in the bottom of the storage hopper 60. Typically, a screen can be provided over the center portion 66, but it is not shown in these figures to better illustrate the components in the center portion 66. The center portion 66 of the storage hopper 60 can have a series of selectively openable gates 72 and corresponding openings 74 beneath the gates 72. Beneath these openings 74 a transport assembly 70 for moving crop material that has fallen through the openings 74 and into the transport assembly 70 can be provided. The transport assembly 70 can move crop material that has fallen through the openings 64 towards the front of the grain cart 10 and into the auger assembly 80. In the auger assembly 80, the crop material can be moved up the auger assembly 80 to be discharged out of the grain cart 10. The transport assembly 70 is typically a pair of augers and corresponding auger housings, but it can also be a conveyor belt, etc. However, in some grain cart 10, such as corner-auger designs, the intake of the auger assembly 80 can be provided beneath the openings 74 and the transport assembly 70 can be a hopper, passage, etc. that directs crop material into the intake of the auger assembly 80.

Figure 4:
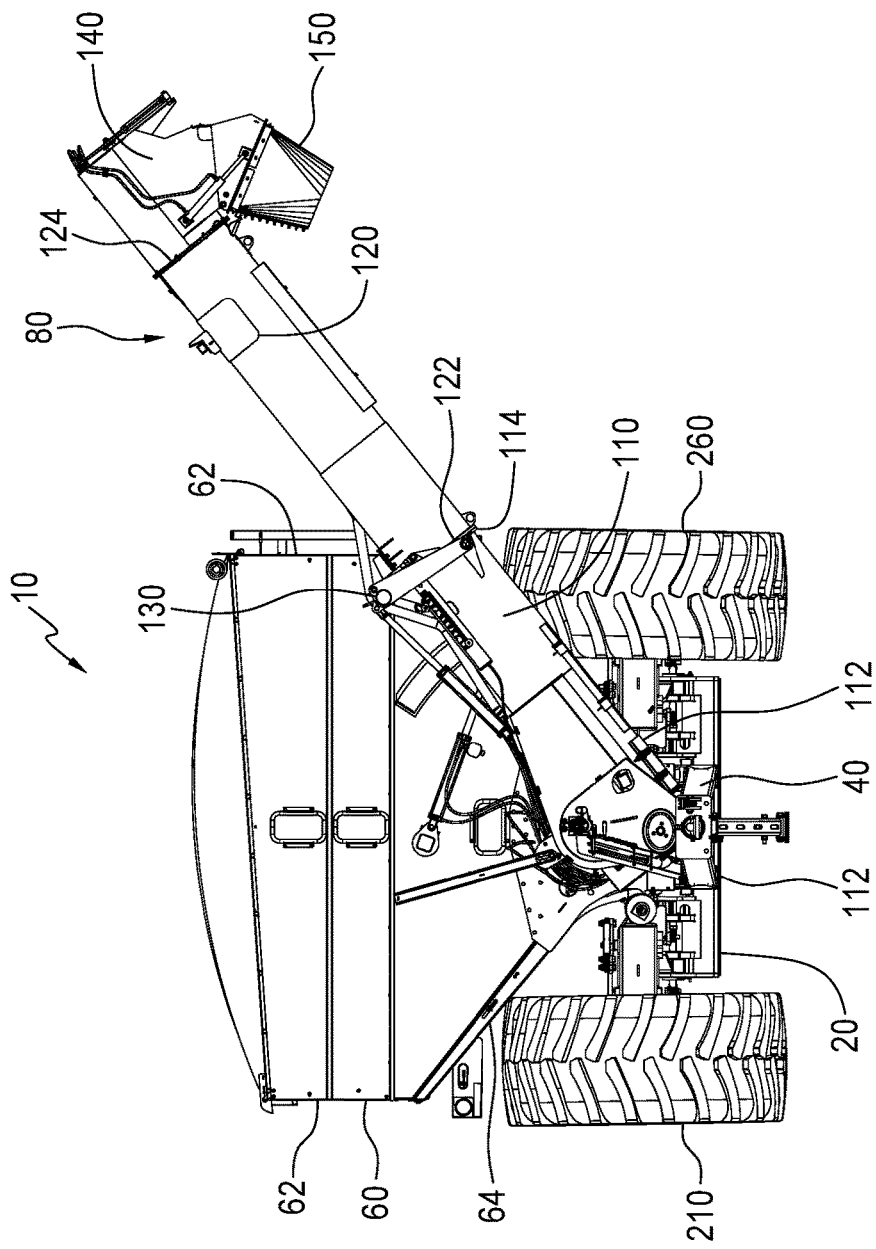
FIG. 4 is a front view of the grain cart of FIG. 1 with the auger assembly in an operating position.
Figure 5:
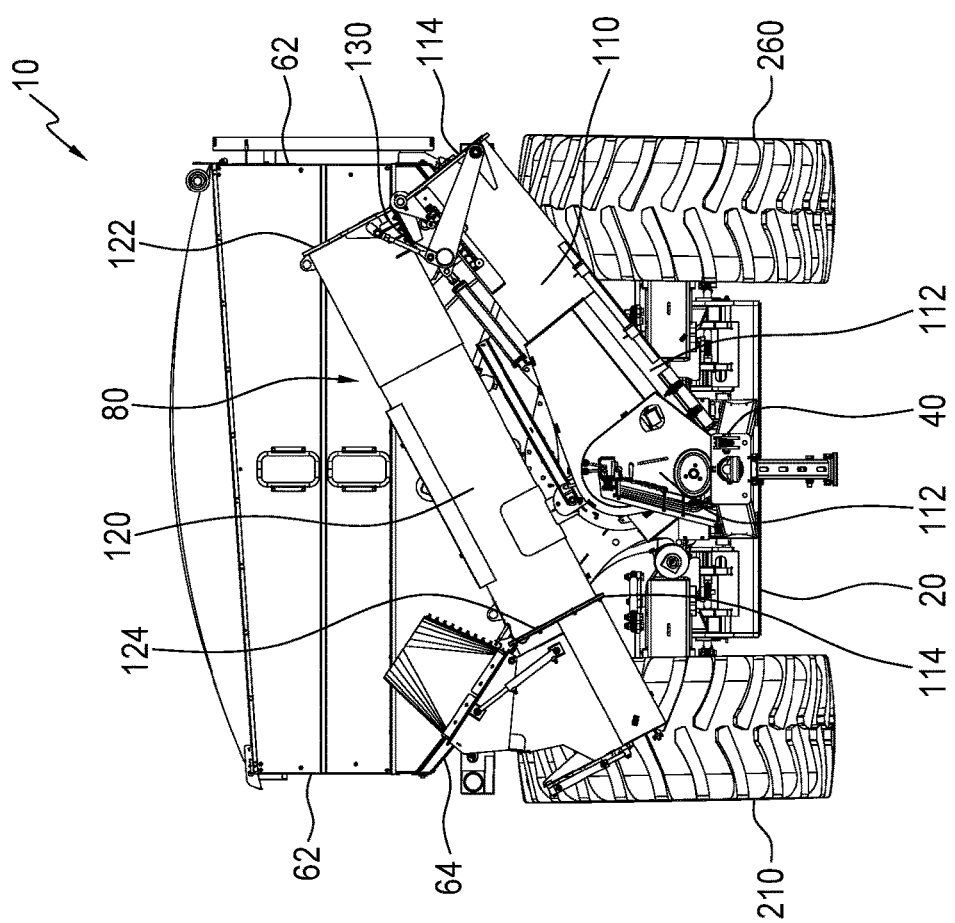
FIG. 5 is a front view of the grain cart of FIG. 1 with the auger assembly in a transport position.

FIG. 4 illustrates a front view of the grain cart 10 where the auger assembly 80 is in an operating position ready to discharge crop material out of the grain cart 10 and into an adjacent truck, trailer, storage bin, etc. and FIG. 5 shows the auger assembly 80 folded up into a transport position. The auger assembly 80 can have a lower auger section 110 and an upper auger section 120. When the auger assembly 80 is in the operating position, the upper auger section 120 and the lower auger section 110 can be positioned coaxial to one another.

The lower auger section 110 and the upper auger section 120 can each have a driveshaft and auger flighting within. The auger fighting in the lower auger section 110 will convey crop material up the lower auger section 110 and the auger fighting in the upper auger section 120. The lower auger section 110 can have an intake end 112 that is joined with the outlet of the transport assembly 70 so that crop material that has reached the end of the transport assembly 70 is conveyed into the intake end 112 of the lower auger section 110. This crop material will then be conveyed up the lower auger section 110 by the flighting in the lower auger section 110 until it reaches a top end 114 of the lower auger section 110. From the top end 114 of the lower auger section 110, the crop material can be transferred to the bottom end 122 of the upper auger section 120 and the flighting in the upper auger section 120 can convey the crop material up the upper auger section 120 to a discharge end 124 of the upper auger section 120.

The discharge end 124 of the upper auger section 120 can be pivotally connected to a discharge assembly 140. A spout 150 can be provided on the discharge assembly 140 to direct the flow of crop material exiting from the discharge end 140 of the upper auger section 120.

When the grain cart 10 is to be transported, especially over relatively long distances, the upper auger section 120 can be pivoted around a pivot hinge 130 so that the upper auger section 120 is no longer coaxial with the lower auger section 110, but rather, rotated around the hinge 130 to be placed closer to parallel with the lower auger section 110 so that the upper auger section 120 does not extend significantly beyond the side of the storage hopper 60 when the grain cart 10 is in the transport position.

Figure 8:
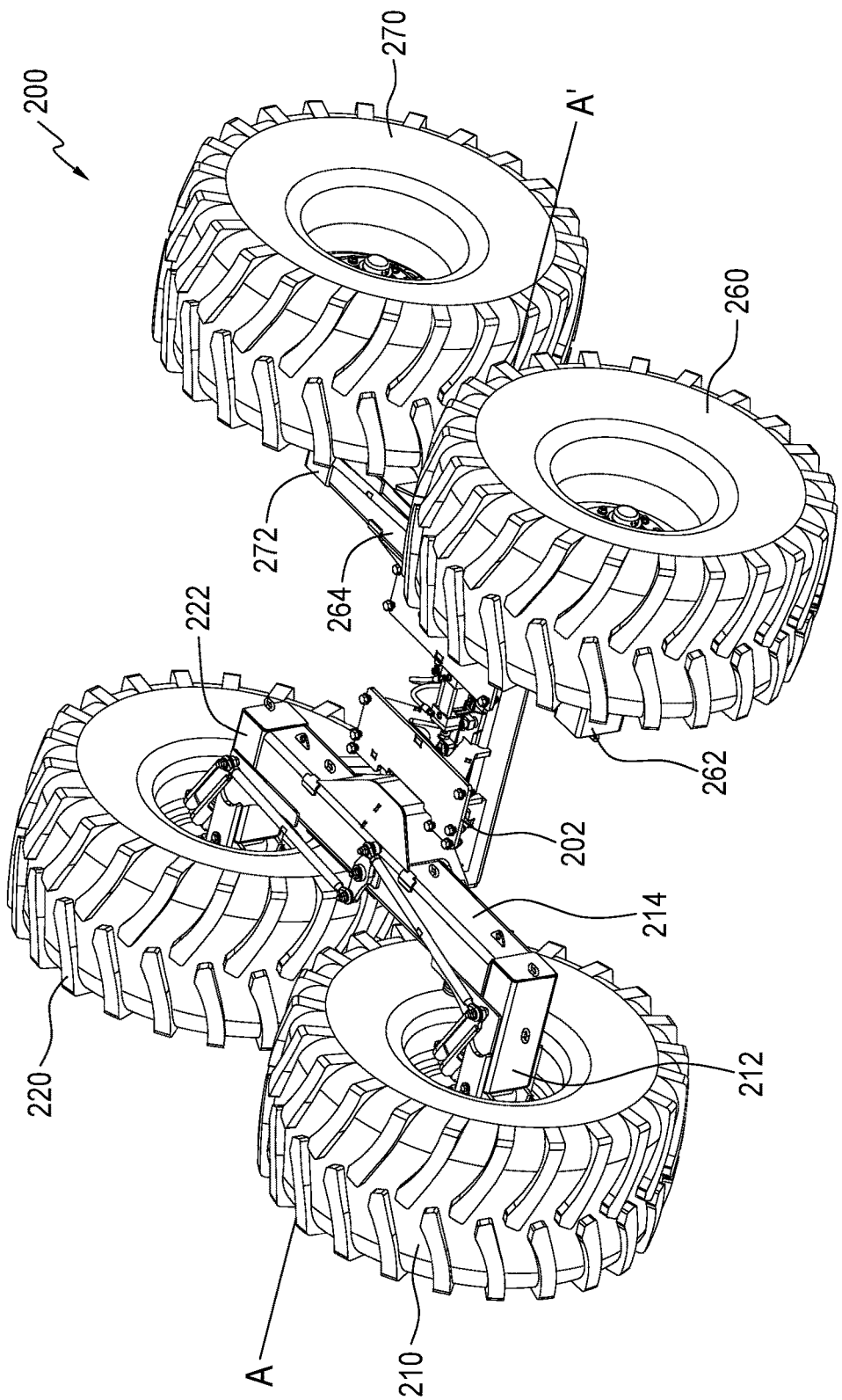
FIG. 8 is a perspective view of a wheel assembly of the grain cart of FIG. 1.

FIG. 8 illustrates a perspective view of the wheel assembly 200 connected to the frame 20 and used to support the frame 20, the storage hopper 60 and the auger assembly 80. The wheel assembly 200 has a first side front wheel 210 and a first side rear wheel 220, both of which are positioned on a first side of the wheel assembly 200. There is also a second side front wheel 260 and a second side rear wheel 270, both of which are positioned on a second side of the wheel assembly 200. The wheel assembly 200 allows the wheels 210, 220, 260, 270, to freely turn when the grain cart 10 is being pulled through a field and being turned by the tow vehicle, the wheels 210, 220, 260, 270 are all operatively connected to cause the wheels 210, 220, 260, 270 to turn in unison so that the both the wheels 210 and 220 on the first side of the wheel assembly 200 and wheels 260 and 270 on the second side of the wheel assembly 200 pivot and follow a curved path to allow the grain cart 10 to be turned easier.

A center section 202 of the wheel assembly 200 can be provided that is attached to the frame 20 so that the center section 202 remains fixed relative to the frame 20. The first side front wheel 210 and the first side rear wheel 220 are operatively connected to a front end 212 and a rear end 222 of a first side suspension member 214, respectively. The second side front wheel 260 and the second side rear wheel 270 are rotatively connected to a front end 262 and a rear end 272 of a second side suspension member 264, respectively.

The first side front wheel 210 and the first side rear wheel 220 are rotatively and pivotally connected to the front end 212 and the rear end 222 of the first side suspension member 214, respectively. The wheels 210, 220 are rotatively connected such that the wheels 210, 220 can rotate around the center of the wheel 210, 220 allowing the grain cart 10 to move forwards and backwards. The wheels 210, 220 are pivotally connected to the first side suspension member 214 such that wheels 210, 220 can pivot around a vertical axis and turn in relation to the grain cart 10 and more particularly relative to the first side suspension member 214 and the frame 20 of the grain cart 10. Similarly, the second side front wheel 260 and the second side rear wheel 270 are rotatively and pivotally connected to the front end 262 and the rear end 272 of the second side suspension member 264, respectively.

The first side suspension member 214 and the second side suspension member 264 can be pivotally attached to the center section 202 so that the first side suspension member 214 and the second side suspension member 264 can pivot around a pivot axis AA' passing horizontally through the center section 202 and perpendicular to a direction of travel of the grain cart 10. In this manner, the first side suspension member 214 can pivot around this pivot axis AA', causing the first side front wheel 210 and the first side rear wheel 220 to be able to angle upwards and downwards relative to the frame 20 of the grain cart 10 and the second side suspension member 264 can pivot around the pivot axis AA', causing the second side front wheel 260 and the second side rear wheel 270 can to be able to be angled upwards and downwards relative to the frame 20 of the grain cart 10 to compensate for changes in the terrain the grain cart 10 is being pulled over. The pivoting of the first side suspension member 214 and therefore the angling of the first side front wheel 210 and the first side rear wheel 220 can be independent from the pivoting of the second side suspension member 264 and therefore the angling of the second side front wheel 260 and the second side rear wheel 270.

Figure 9:
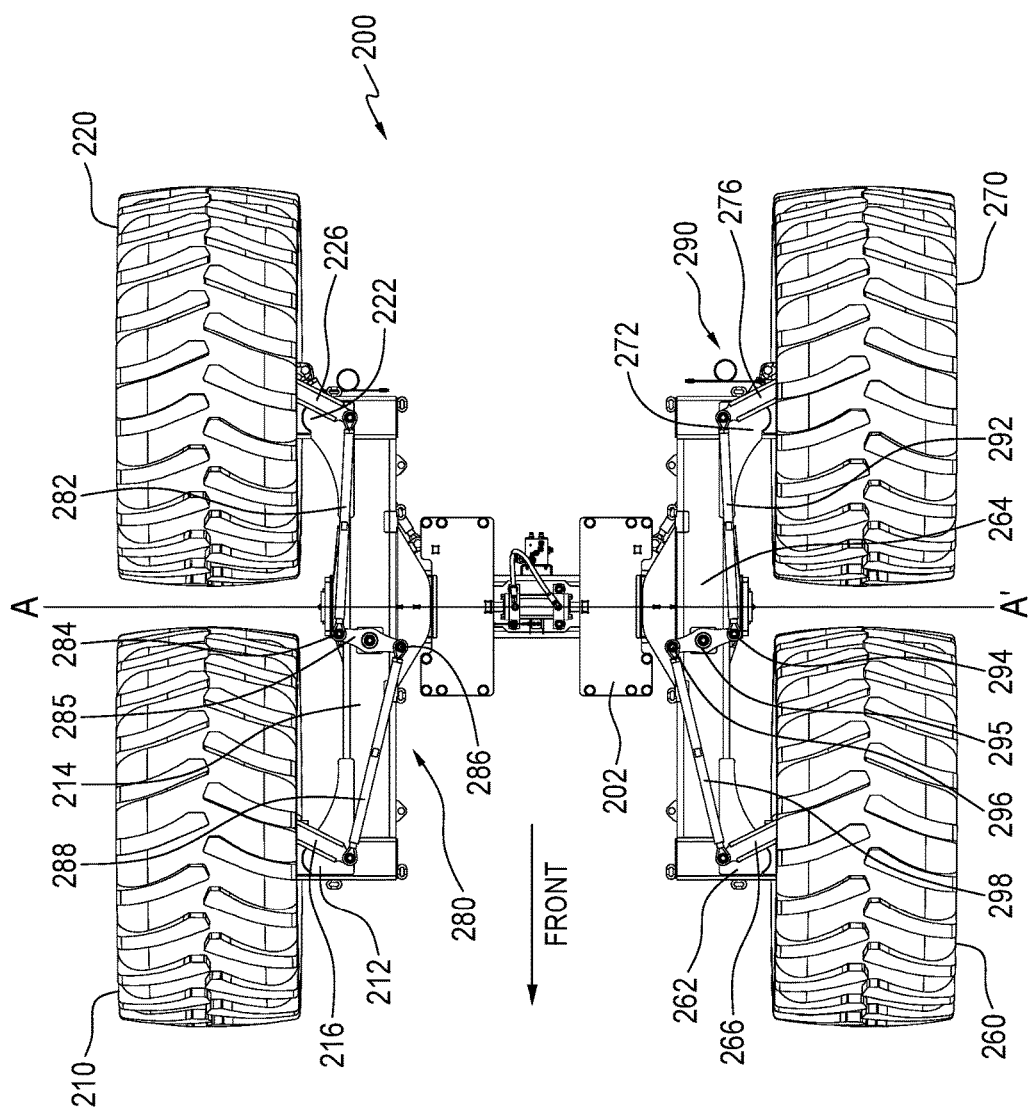
FIG. 9 is a top view of the wheel assembly of FIG. 8.

FIG. 9 illustrates a top view of the wheel assembly 200 showing a first side steering link assembly 280 and a second side steering link assembly 290. The first side steering link assembly 280 and the second side steering link assembly 290 can be positioned above the first side suspension member 214 and the second side suspension member 264, respectively. The first side steering link assembly 280 can be used to coordinate the pivoting of the first side front wheel 210 and the first side rear wheel 220 in tandem and the second side steering link assembly 290 can be used to coordinate the pivoting of the second side front wheel 260 and the second side rear wheel 270 in tandem.

The first side steering link assembly 280 can include a first side rear suspension link 282, a first side bell crank 285, and a first side front suspension link 288. The first side rear suspension link 282 can be connected between a rear steering arm 226 of the first side rear wheel 220 to pivot the first side rear wheel 220 relative to the first side suspension member 214 and a first side 284 of the first side bell crank 285. The first side rear suspension link 282 can be an adjustable tie rod. A first side front suspension link 288 can be connected between a front steering arm 216 of the first side front wheel 210 to pivot the first side front wheel 210 relative to the first side suspension member 214 and a second side 286 of the first side bell crank 285. The first side 284 and the second side 286 of the first side bell crank 285 can be positioned approximately 180° from each other. The first side front suspension link 288 can be an adjustable tie rod.

In this manner, when the first side rear wheel 210 pivots, such as when the grain cart 10 is being towed through a curving path (i.e. turn), the pivoting of the first side rear wheel 220 will move the rear steering arm 226, which in turn will move the first side rear suspension link 282 connected to the first side 284 of the first side bell crank 285 and thereby rotate the first side bell crank 285. The rotation of the first side bell crank 285 will move the first side front suspension link 288 connected to the second side 286 of the bell crank 285, which in turn will move the front steering arm 216 and pivot the first side front wheel 210. Because of the configuration of the first side front suspension link 288, the first side bell crank 285 and the first side rear suspension link 282, the first side bell crank 285 will reverse the direction of motion from the first side rear suspension link 282 and the first side front suspension link 288 and therefore the first side front wheel 210 and the first side rear wheel 220 will be pivoted in opposite directions. For example, when the first side rear wheel 220 pivots out from a centerline of the grain cart 10, the first side front wheel 210 is pivoted in towards the centerline of the grain cart 10 by the first side steering link assembly 280 and vice versa.

Similarly, the second side steering link assembly 290 can have a second side rear suspension link 292, a second side bell crank 295 and a second side front suspension link 298. The second side rear suspension link 292 can be connected between a rear steering arm 276 of the second side rear wheel 270 to pivot the second side rear wheel 270 relative to the second side suspension member 264 and a first side 274 of the bell crank 265. The second side rear suspension link 292 can be an adjustable tie rod. A second side front suspension link 292 can be connected between a front steering arm 266 of the second side front wheel 260 to pivot the second side front wheel 260 relative to the second side suspension member 264 and a second side 296 of the second side bell crank 295. The first side 294 and the second side 296 of the second side bell crank 295 can be positioned approximately 180° from one another. The second side front suspension link 292 can be an adjustable tie rod.

In this manner, when the second side rear wheel 270 pivots, such as when the grain cart 10 is being towed through a turn, the pivoting of the second side rear wheel 270 will move the rear steering arm 276, which in turn will move the second side rear suspension link 292 connected to the first side 294 of the second side bell crank 295 and thereby rotate the second side bell crank 295. The rotation of the second bell crank 295 will move the second side front suspension link 298 connected to the second side 296 of the second side bell crank 295. The moving second side front suspension link 298 will in turn move the front steering arm 266 and pivot the second side front wheel 260. Because of the configuration of the second side front suspension link 298, the bell crank 295 and the second side rear suspension link 292, the second side bell crank 295 will reverse the direction of motion from the second side rear suspension link 292 and the second side front suspension link 298 and therefore the second side front wheel 260 and the second side rear wheel 270 will pivot in opposite directions. For example, when the second side rear wheel 270 pivots out from a centerline of the grain cart 10, the second first side front wheel 260 is pivoted in towards the centerline of the grain cart 10 and vice versa.

In addition to the wheels 210, 220, 260 and 270 on each side of the wheel assembly 200 being operatively coupled together so that the wheels 210, 220, 260 and 270 on each side of the wheel assembly 200 pivot in conjunction, the steering components on the first side of the wheel assembly 200 and the steering components on the second side of the wheel assembly 200 can be operatively connected so that pivoting of the first side front wheel 210 and the first side rear wheel 220 will cause the second side front wheel 260 and the second side rear wheel 270 to pivot as well and vice versa.

The pivoting of the first side suspension member 214 relative to the center section 202 will not affect the operation of the first side steering link assembly 280 because the first side rear suspension link 282, the first side bell crank 285 and the first side front suspension link 288 will remain fixed in position relative to the first side suspension member 214 as the first side suspension member 214 pivots relative to the center section 202. Similarly, the pivoting of the second side suspension member 264 relative to the center section 202 will not affect the operation of the second side steering link assembly 290 because the second side rear suspension link 292, the second side bell crank 295 and the second side front suspension link 298 will remain fixed in position relative to the second side suspension member 264 as the second side suspension member 264 pivots relative to the center section 202.

Figure 10:
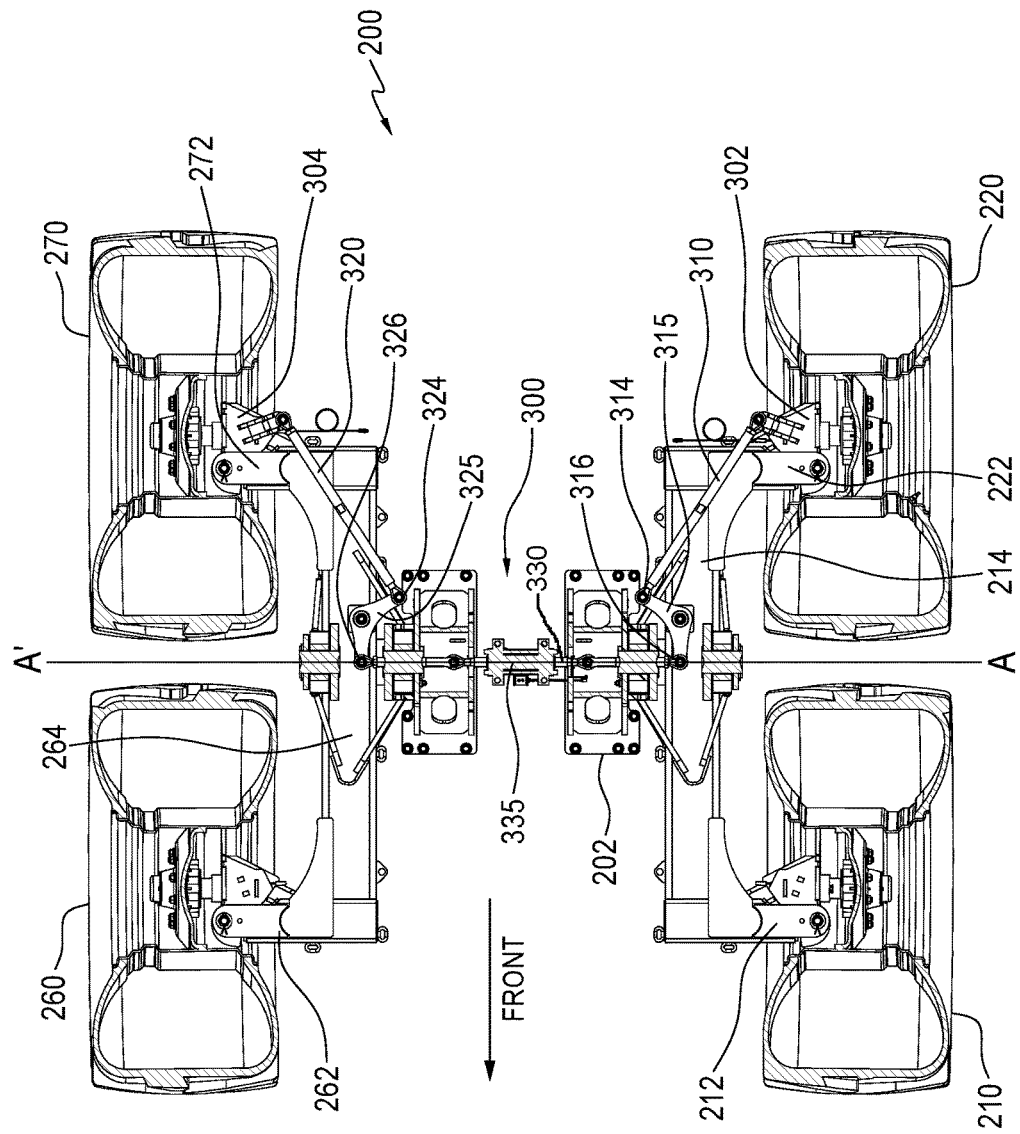
FIG. 10 is a bottom view of the wheel assembly of FIG. 8.

FIG. 10 is a bottom view of the wheel assembly 200 and a unison linkage assembly 300 operatively coupling the pivoting of the wheels 210, 220 on the first side of the wheel assembly 200 with the pivoting of the wheels 260, 270 on the second side of the wheel assembly 200. The unison linkage assembly 300 can connect the first side rear wheel 220 and the second side rear wheel 270 so that the pivoting of one of these two wheels 220, 270 causes the other wheel 270, 220 to pivot as well. A first side cross linkage 310 can be connected between a lower steering arm 302 of the first side rear wheel 220 and able to pivot the first side rear wheel 220 relative to the first side suspension member 214 and a first side 314 of a first cross bell crank 315. Similarly, a second side cross linkage 320 can be connected between a lower steering arm 304 of the second side rear wheel 270 and able to pivot the second side rear wheel 270 relative to the second side suspension member 264 and a first side 324 of a second cross bell crank 325. A rod member 330 can be connected between the a second side 316 of the first cross bell crank 315 and a second side 326 of the second cross bell crank 325.

The rod member 330 can pass through a double rod end hydraulic cylinder 335 so that the double rod end cylinder 335 can move the rod member 330 in either direction, lock the rod member 330 in place or allow the rod member 330 to "float" or move freely back and forth in the double rod end cylinder 335. The double rod end hydraulic cylinder 335 can be provided in the center section 202 of the wheel assembly 200.

The rod member 330 can be aligned with the pivot axis AA' so that the rod member 330 is at the center of the pivot point between the first side suspension member 214 and the center section 202 and at the center of the pivot point between the second side suspension member 264 and the center section 202 so that the first side suspension member 214 and the second side suspension member 264 pivot around the rod member 330.

The first side 314 and the second side 316 of the first cross bell crank 315 can be provided at an angle other than 180° so that the first cross bell crank 315 can alter the direction of motion from the first side cross linkage 310 and the rod member 330. The first side 324 and the second side 236 of the second cross bell crank 325 can also be provided at an angle other than 180° so that the second cross bell crank 325 can alter the direction of motion from the second side cross linkage 320 and the rod member 330.

When the double rod end hydraulic cylinder 335 is placed in the "float" mode, the rod member 330 can move freely through the double rod end hydraulic cylinder 335. The rod member 330 will mechanically couple the first cross bell crank 315 and the second cross bell crank 325, but the rod member 330 will be able to move freely. When the first side rear wheel 220 pivots out from the centerline of the grain cart 10, the lower steering arm 302 connected to first side rear wheel 220 will move the first side cross linkage 310 which will in turn rotate the first cross bell crank 315. As the first cross bell crank 315 rotates, the first cross bell crank 315 will pull the rod member 330 and the rod member will in turn rotate the second cross bell crank 325. As the second cross bell crank 325 rotates, the second cross bell crank 325 will push the second side cross linkage 320 which will in turn push on the steering arm 304 of the second side rear wheel 270 which will pivot the second side rear wheel 270 in the same direction as the first side rear wheel 220 is pivoting, causing the second side rear wheel 270 to pivot in towards the centerline of the grain cart 10.

The effect of the pivoting of the first side suspension member 214 and the second side suspension member 264 relative to the center section 202 can be reduced by the placement of the rod member 330 along the pivot axis AA'. Unlike the first side steering link assembly 280 and the second side steering link assembly 290 that can move entirely with the first side suspension member 214 and the second side suspension member 264, respectively, the unison linkage assembly 300 has to connect from the first side suspension member 214 across the center section 202 and to the second side suspension member 264. Both the first side suspension member 214 and the second side suspension member 264 can pivot relative to the center section 202 and independently of each other. By having the rod member 330 extend along the pivot axis AA' and ends of the rod member 330 extend out of the center section 202, the first cross bell crank 315 can remain fixed in position relative to the first side suspension member 214 and the second cross bell crank 325 can remain fixed in position relative to the second side suspension member 264. This will allow the first cross bell crank 315, the first side cross linkage 310 and the steering arm 302 of the first side rear wheel 220 to remain fixed in position relative to the first side suspension member 214 as the first side suspension member 264 pivots relative to the center section 202 and the second cross bell crank 325, the second side cross linkage 320 and the lower steering arm 304 of the second side rear wheel 270 to remain fixed in position relative to the second side suspension member 264 as the second side suspension member 264 pivots relative to the center section 202.

The rod member 330 will stay in position along the pivot axis AA' and the where the rod member 330 connects to the second side 316 of the first cross bell crank 315 the end of the rod member 330 can be pivotally connected so that the end of the rod member 330 can rotate relative to the second side 316 of the first cross bell crank 315 allowing the first cross bell crank 315 to be fixed in position relative to the first side suspension member 214 and move with the pivoting of the first side suspension member 214. The connection between the end of the rod member 330 and the second side 316 of the first cross bell crank 315 could be a spherical bearing so that the rod member 330 and the second side 316 allow more relative motion than just rotational motion. In a similar manner, where the rod member 330 connects to the second side 326 of the second cross bell crank 325 the end of the rod member 330 can be pivotally connected so that the end of the rod member 330 can rotate relative to the second side 326 of the second cross bell crank 325 allowing the second cross bell crank 325 to be fixed in position relative to the second side suspension member 264 and move with the pivoting of the second side suspension member 264. The connection between the end of the rod member 330 and the second side 326 of the second cross bell crank 325 could be a spherical bearing so that the rod member 330 and the second side 326 allow more relative motion than just rotational motion.

The unison linkage assembly 300 will cause both the first side rear wheel 220 and the second side rear wheel 270 to pivot in the same direction. When one of the first side rear wheel 220 and the second side rear wheel 270 is pivoted, such as when the tow vehicle turns the grain cart 10, and the double end hydraulic cylinder 335 is in "float" mode, the other of the second side rear wheel 270 and the first side rear wheel 220 will be pivoted in the same direction.

Referring again to FIG. 9, when the unison linkage assembly 300 causes the first side rear wheel 220 and the second side rear wheel 270 to pivot in unison, the first side steering link assembly 280 will cause the first side front wheel 210 to pivot in an opposite direction to the first side rear wheel 220 and the second side steering link assembly 290 will cause the second side front wheel 260 to pivot in an opposite direction to the second side rear wheel 270.

To back up the grain cart 10 with the tow vehicle, the rod member 330 can be locked in place by the double end hydraulic cylinder 335, preventing the first side rear wheel 220 and the second side rear wheel 270 from pivoting. Because the first side rear wheel 220 is being held in place by the unison linkage assembly 300, the first side steering link assembly 280 will also prevent the first side front wheel 210 from pivoting and the second side steering link assembly 290 will prevent the second side front wheel 260 from pivoting.

The double end hydraulic cylinder 335 can also be used to pivot the wheels 210, 220, 260, 270 as desired. By routing the hydraulic fluid to the double end hydraulic cylinder 335 hydraulic fluid, the double end hydraulic cylinder 335 can be used to force the rod member 330 to one side or the other, thereby pivoting all of the wheels 210, 220, 260, 270. This can be useful in packing up the grain cart 10 when it has to be backed into a specific position instead of straight back or maneuvering the grain cart 10 in a relatively tight space.

The linkages can be adjustable in length so that the amount the first side front wheel 210 pivots relative to the first side rear wheel 220 and the amount the second side front wheel 260 pivots relative to the second side rear wheel 270 can be adjusted and set to a desired amount. The first side rear suspension link 282 and/or the first side front suspension link 288 can be an adjustable links where the length of the first side rear suspension link 282 and/or the first side front suspension link 288 can be increased or decreased. This allows a person to adjust or "tune" the positioning of the first side front wheel 210 relative to the first side rear wheel 220 to align the first side front wheel 210 and the first side rear wheel 220 to both be pointed straight ahead when the grain cart 10 is being pulled forward. Similarly, the second side rear suspension link 292 and/or the second side front suspension link 298 can be an adjustable links where the length of the second side rear suspension link 292 and/or the second side front suspension link 298 can be increased or decreased. This allows a person to adjust or "tune" the positioning of the second side front wheel 260 relative to the second side rear wheel 270 to align the second side front wheel 260 and the second side rear wheel 270 to both be pointed straight ahead when the grain cart 10 is being pulled forward. This can also be used to ensure the wheels 210, 220 on the first side of the grain cart 10 are parallel with the wheels 260, 270 on the second side of the grain cart when the grain cart 10 is being pulled straight ahead. This can ensure the tires are running true and pointed straight ahead when the grain cart 10 is being pulled directly ahead. This can reduce or eliminate any side loading on the tires, reduce tire wear and improve the performance of the grain cart 10.

The unison link assembly 300 can also be configured so that the amount the first side rear wheel 220 pivots relative to the second side rear wheel 270 can be set and vice versa. The first side cross linkage 310 and the second side cross linkage 320 can be adjustable in length so that the first side rear wheel 220 pivots relative to the second side rear wheel 270 can be positioned parallel to one another when the grain cart 10 is moving directly forward. The configuration of the first side cross linkage 310 and the second cross bell crank 325 can be chosen so that the wheels on the outside of a turn to pivot less than the wheels on the inside of the grain cart 10 to pivot when the grain cart 10 is turning with the wheels on the outside of the turn turning less than the wheels on the inside of the turn. This can be accomplished by choosing the size of the first cross bell crank 315 and the second cross bell crank 325. By choosing a first cross bell crank 315 with a distance between the pivot point of the first cross bell crank 315 and the first side 314 of the first cross bell crank 315 that is greater than the distance between the pivot point of the first cross bell crank 315 and the second side 316 of the first cross bell crank 315 and a second cross bell crank 325 with a distance between the pivot point of the second cross bell crank 325 and the first side 324 of the second cross bell crank 325 that is greater than the distance between the pivot point of the second cross bell crank 325 and the second side 326 of the second cross bell crank 325 this can be achieved. Having the amount the different wheels pivot curing a turn can reduce the amount of tire scrub on the ground and reduce the towing force needed to tow the grain cart 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A grain cart comprising:

a frame;

a hitch assembly attached to a front end of the frame;

a storage hopper provided on the frame;

an auger assembly operatively connected to the storage hopper to discharge particulate material from the storage hopper out of the grain cart; and a wheel assembly attached to the frame, the wheel assembly comprising:

a first side suspension member;

a second side suspension member;

a first side front wheel rotatively and pivotally connected to a front end of the first side suspension member;

a first side rear wheel rotatively and pivotally connected to a rear end of the first side suspension member;

a second side front wheel rotatively and pivotally connected to a front end of the second side suspension member;

a second side rear wheel rotatively and pivotally connected to a rear end of the second side suspension member;

a first side steering link assembly operatively coupling the pivoting of the first side front wheel and the first side rear wheel so that the first side front wheel and the first side rear wheel pivot in opposite directions;

a second side steering link assembly operatively coupling the pivoting of the second side front wheel and the second side rear wheel so that the second side front wheel and the second side rear wheel pivot in opposite directions; and a unison linkage assembly operatively coupling the pivoting of the first side rear wheel and first side front wheel with the pivoting of the second side rear wheel and the second side front wheel, wherein the unison linkage assembly comprises:

a first side cross linkage connected to a lower steering arm of the first side rear wheel;

a first cross bell crank having a first side and a second side, the first side connected to the first side cross linkage;

a second cross bell crank having a first side and a second side;

a second side cross linkage connected to a lower steering arm of the second side rear wheel and the first side of the second cross bell crank; and a rod member connected between the second side of the first cross bell crank and the second side of the second cross bell crank.

2. The grain cart of claim 1 wherein the first side steering link assembly comprises:
a first side rear suspension link connected to a first steering arm of the first side rear wheel;
a first side bell crank having a first side and a second side, the first side of the first side bell crank connected to the first side rear suspension link; and
a first side front suspension link connected to a steering arm of the first side front wheel and the second side of the first side bell crank.

3. The grain cart of claim 2 wherein the second side steering link assembly comprises:
a second side rear suspension link connected to a first steering arm of the second side rear wheel;
a second side bell crank having a first side and a second side, the first side of the second side bell crank connected to the second side rear suspension link; and
a second side front suspension link connected to a steering arm of the second side front wheel and the second side of the second side bell crank.

4. The grain cart of claim 2 wherein the first side of the first side bell crank is 180° from the second side of the first side bell crank.

5. The grain cart of claim 2 wherein the first side of the second side bell crank is 180° from the second side of the first side bell crank.

6. The grain cart of claim 1 wherein the first side steering link assembly is positioned above the first side suspension member and the second side steering link assembly is positioned above the second side suspension member.

7. The grain cart of claim 1 wherein a double end hydraulic cylinder is provided acting on the rod member.

8. The grain cart of claim 1 wherein the wheel assembly further comprises a center section attached to the frame and the first side suspension member is pivotally connected to a first side of the center section so that the first side suspension member pivots around a pivot axis and the second side suspension member is pivotally connected to a second side of the center section so that the second side suspension member pivots around the pivot axis.

9. The grain cart of claim 8 wherein the rod member is aligned along the pivot axis.

10. The grain cart of claim 9 wherein the rod member passes through the center section and ends of the rod member extend out of the center section to the first side suspension member and the second side suspension member.

11. The grain cart of claim 10 wherein a first end of the rod member is pivotally connected to the second side of the first cross bell crank and a second end of the rod member is pivotally connected to the second side of the second cross bell crank.

12. The grain cart of claim 11 wherein the first side steering link assembly comprises:
a first side rear suspension link connected to a first steering arm of the first side rear wheel;
a first side bell crank having a first side and a second side, the first side of the first side bell crank connected to the first side rear suspension link; and
a first side front suspension link connected to a steering arm of the first side front wheel and the second side of the first side bell crank,
and wherein the second side steering link assembly comprises:
a second side rear suspension link connected to a first steering arm of the second side rear wheel;
a second side bell crank having a first side and a second side, the first side of the second side bell crank connected to the second side rear suspension link; and
a second side front suspension link connected to a steering arm of the second side front wheel and the second side of the second side bell crank,
and wherein the first side rear suspension link, the first side bell crank and the first side front suspension link remain fixed in position relative to the first side suspension member as the first side suspension member pivots relative to the center section.

13. The grain cart of claim 12 wherein the second side rear suspension link, the second side bell crank and the second side front suspension link remain fixed in position relative to the second side suspension member as the first side suspension member pivots relative to the center section.

14. The grain cart of claim 13 wherein the first side cross linkage and the first cross bell crank remain fixed in position relative to the first side suspension member connected as the first side suspension member pivots relative to the center section.

15. The grain cart of claim 14 wherein the second side cross linkage and the second cross bell crank remain fixed in position relative to the second side suspension member connected as the second side suspension member pivots relative to the center section.

16. The grain cart of claim 12 wherein the first side rear suspension link and the second side rear suspension link are adjustable in length.

17. The grain cart of claim 12 wherein the first side front suspension link and the second side front suspension link are adjustable in length.

18. The grain cart of claim 1 wherein a distance between the first side of the first cross bell crank and a pivot connection of the first cross bell crank is greater than a distance between the second side of the first cross bell crank and the pivot connection of the first cross bell crank.

19. The grain cart of claim 1 wherein a distance between the first side of the second cross bell crank and a pivot connection of the second cross bell crank is greater than a distance between the second side of the second cross bell crank and the pivot connection of the second cross bell crank.

* * * * *